(12) United States Patent
Chase et al.

(10) Patent No.: US 10,644,511 B2
(45) Date of Patent: May 5, 2020

(54) MULTI-ENGINE OPTIMIZER ZONE STRATEGY

(71) Applicant: Caterpillar Inc., Peoria, IL (US)

(72) Inventors: James Chase, Chillicothe, IL (US); Perry D. Converse, Lafayette, IN (US); Michael A. Snopko, Washington, IL (US); Chris W. Menge, Monmouth, IL (US)

(73) Assignee: Caterpillar Inc., Peoria, IL (US)

( * ) Notice: Subject to any disclaimer, the term of this patent is extended or adjusted under 35 U.S.C. 154(b) by 184 days.

(21) Appl. No.: 15/804,383

(22) Filed: Nov. 6, 2017

(65) Prior Publication Data
US 2019/0140454 A1 May 9, 2019

(51) Int. Cl.
| | |
|---|---|
| *H02J 3/46* | (2006.01) |
| *B63H 21/21* | (2006.01) |
| *B63J 3/00* | (2006.01) |
| *H02K 7/18* | (2006.01) |
| *G05B 15/02* | (2006.01) |
| *H02P 9/04* | (2006.01) |
| *B63J 3/04* | (2006.01) |
| *H02J 3/38* | (2006.01) |

(Continued)

(52) U.S. Cl.
CPC ............... *H02J 3/46* (2013.01); *B63H 21/17* (2013.01); *B63H 21/21* (2013.01); *B63J 3/00* (2013.01); *B63J 3/04* (2013.01); *G05B 15/02* (2013.01); *H02J 3/381* (2013.01); *H02K 7/1807* (2013.01); *H02K 7/1815* (2013.01); *H02P 9/04* (2013.01); *B63H 2021/216* (2013.01); *B63J 2003/002* (2013.01); *F02B 63/00* (2013.01); *H02P 2101/25* (2015.01); *H02P 2101/35* (2015.01)

(58) Field of Classification Search
CPC ..... H02J 3/46; B63H 21/21; B63H 2021/216; B63J 3/00; B63J 2003/002; F02B 63/00; G05B 15/02; H02K 7/1807; H02K 7/1815; H02P 9/04; H02P 2101/25; H02P 2101/35
See application file for complete search history.

(56) References Cited

U.S. PATENT DOCUMENTS 9,683,503 B2    6/2017  Zhang et al.
2002/0169523 A1*  11/2002  Ross ....................... H02J 3/387
                                                      700/286

(Continued)

FOREIGN PATENT DOCUMENTS

EP        2672602        5/2016

OTHER PUBLICATIONS

Mohammad Abdulqader, "Modeling and control of stand-alone and parallel operating diesel generators", Thesis for the Degree of Master of Science in Electrical Engineering, King Fahd University of Petroleum & Minerals Dhahran, Saudi Arabia, May 2000 (Year: 2000).*

*Primary Examiner* — Thomas C Lee
*Assistant Examiner* — Michael Tang
(74) *Attorney, Agent, or Firm* — Leydig, Voit & Mayer, Ltd.

(57) ABSTRACT

A power system having a plurality of gensets compares the instantaneous power consumption with a plurality of power consumption zone boundaries and classifies the power consumption into a selected zone. Each zone includes a corresponding base power value and a corresponding dynamic range value, which are apportioned among the plurality of gensets.

20 Claims, 6 Drawing Sheets

(51) Int. Cl.
*B63H 21/17* (2006.01)
*H02P 101/35* (2016.01)
*H02P 101/25* (2016.01)
*F02B 63/00* (2006.01)

(56) References Cited

U.S. PATENT DOCUMENTS

| | | |
|---|---|---|
| 2006/0149744 A1* | 7/2006 | Das .................... H04L 67/2819 |
| 2011/0241630 A1* | 10/2011 | Ritchey .................... H02P 9/02 |
| | | 322/23 |
| 2013/0342020 A1 | 12/2013 | Blevins et al. |
| 2014/0152007 A1 | 6/2014 | Sterregaard et al. |
| 2015/0198144 A1* | 7/2015 | Park ...................... G06Q 50/10 |
| | | 290/44 |
| 2015/0236703 A1 | 8/2015 | Alfermann |
| 2015/0274275 A1* | 10/2015 | Dust .................... B63H 21/21 |
| | | 307/9.1 |
| 2016/0077507 A1* | 3/2016 | Sheble .................. G06Q 10/06 |
| | | 700/295 |
| 2016/0259356 A1 | 9/2016 | Converse |
| 2017/0012440 A1 | 1/2017 | Converse |

* cited by examiner

MULTI-ENGINE OPTIMIZER ZONE STRATEGY

TECHNICAL FIELD

This patent disclosure relates generally to power generation plants and, more particularly, to power generation plants for marine applications.

BACKGROUND

Marine vessels and other structures such as platforms often include multiple engines driving electrical generators and/or mechanical systems to operate one or more primary loads such as propulsion systems, drilling apparatus and the like, and various auxiliary loads such as heating, ventilation and air conditioning (HVAC), lighting, pumps, and others. The engines can be mechanically connected to the loads or electrically connected to the loads by way of generators. In some applications, the loads of a vessel can be driven both mechanically and electrically in a hybrid arrangement.

In typical applications, the various generators, each of which is operated by an engine, are associated on one or more electrical buses and are operated to produce about the same electrical power in proportion to their rated power depending on the then-present electrical load on the bus to which the generators are connected to. For example, a particular marine vessel may have four identical engines, each engine driving a generator capable of producing about 5,000 kW. During operation, when a loading on the electrical bus consumes about 4,000 kW, each of the engine/generator sets may be operated to produce about 1,000 kW. When a load changes, all engines are operated at a higher or lower output to match the load consumption on the bus.

This type of operation may often cause the engines to operate in an inefficient operating condition, both in terms of their steady state operation and also in their transient operation. The inefficient operating may include a large fuel consumption, and may also include undesirable operating conditions in terms of various operating parameters.

Variations in the way of operating multi-engine systems in this context to improve overall system operation have been proposed in the past. For example, U.S. Patent Application Publication No. 2016/0259356 ("Converse") describes a power system in which each of a plurality of power sources is controlled to operate in a particular zone based on the current operating mode of each power source and also based on overall load demand on the system. In particular, Converse describes a control arrangement in which the overall power of the system is apportioned among the plurality of power sources, equally or unequally, based on any number of performance goals, including fuel consumption, transient response, emissions, system wear, and the like.

SUMMARY

The disclosure describes, in one aspect, a power system for a vessel. The power system includes a plurality of gensets, each genset including an engine connected to an electrical power generator such that the plurality of gensets includes a plurality of engines and a plurality of electrical power generators. The plurality electrical power generators is adapted to provide electrical power to an electrical bus of the vessel, which is connected to one or more power consuming devices or systems onboard the vessel. At least one sensor is associated with the electrical bus and provides an electrical signal during operation. The electrical signal is indicative of an electrical power consumption through the electrical bus. The electrical power consumption is variable over time and the sensor is configured to provide the electrical signal, in real time.

An electronic controller is associated with the plurality of gensets and with the at least one sensor. The electronic controller is programmed and configured to monitor the electrical signal during operation to determine an instantaneous power consumption, compare the instantaneous power consumption with a plurality of power consumption zone boundaries to classify the instantaneous power consumption into a selected one zone of the plurality of power consumption zones, wherein each of the plurality of power consumption zones includes a corresponding base power and a corresponding dynamic range, apportion the corresponding base power and the corresponding dynamic range of the selected one zone among the plurality of gensets, and provide command signals to operate each genset of the plurality of gensets based on a corresponding portion of the base power value and the dynamic range value of the selected one zone that is allotted to each genset of the plurality of gensets.

In another aspect, the disclosure describes an electrical power system for a marine vessel, the electrical power system comprising a plurality of gensets, each genset including an engine connected to an electrical power generator, wherein a plurality of electrical power generators is connected to an electrical bus of the marine vessel, the electrical bus of the marine vessel being connected to one or more power consuming devices or systems onboard the marine vessel. The electrical power system includes at least one sensor associated with the electrical bus, the at least one sensor providing an electrical signal during operation, the electrical signal being indicative of an electrical power consumption through the electrical bus, wherein the electrical power consumption is variable over time and wherein the at least one sensor is configured to provide the electrical signal, in real time.

An electronic controller is associated with the plurality of gensets and with the at least one sensor. The electronic controller is programmed and configured to monitor the electrical signal during operation to determine an instantaneous power consumption, record the instantaneous power consumption over a time period as recorded values, analyze the recorded values to determine a plurality of power consumption zone boundaries, compare the instantaneous power consumption with the plurality of power consumption zone boundaries to classify the instantaneous power consumption into a selected one zone of the plurality of power consumption zones, wherein each of the plurality of power consumption zones includes a corresponding base power value and a corresponding dynamic range value, apportion the corresponding base power value and the dynamic range value of the selected one zone among the plurality of gensets, and provide command signals to operate each genset of the plurality of gensets based on the corresponding base power value and the corresponding dynamic range value of the selected one zone that is allotted to each genset.

In yet another aspect, the disclosure describes a method for operating a power system for a marine vessel, the power system comprising a plurality of gensets connected to an electrical bus of the marine vessel, the electrical bus of the marine vessel being connected to one or more power consuming devices or systems onboard the marine vessel. The method includes using a sensor associated with the electrical bus to provide an electrical signal indicative of an electrical power consumption through the electrical bus to an electronic controller, monitoring the electrical signal with the electronic controller to determine an instantaneous power consumption, compiling a set of recorded values in the electronic controller, the recorded values being indicative of the instantaneous power consumption with respect to time for a time period, analyzing the recorded values with the electronic controller to determine a plurality of power consumption zone boundaries, comparing the instantaneous power consumption with the plurality of power consumption zone boundaries to classify the instantaneous power consumption into a selected one zone of the plurality of power consumption zones, wherein each of the plurality of power consumption zones includes a corresponding base power value and a corresponding dynamic range value, apportioning the corresponding base power value and the corresponding dynamic range value of the selected one zone among the plurality of gensets, and providing command signals to operate each genset of the plurality of gensets based on the corresponding base power value and the corresponding dynamic range value of the selected one zone that is allotted to each genset.

DETAILED DESCRIPTION

This disclosure relates to management systems for multi-engine systems. More particularly, the disclosure relates to a management system that operates a plurality of engines operating electrical power generators that are associated with one or more electrical buses, onto which electrical loads are connected, in accordance with a plurality of predefined operating zones. The operating zones are determined automatically based on the operating schedule or history of the system such that the system can operate in steady state and transient modes of operation with improved efficiency and with desired attributes. In some embodiments, a set of optimization solutions, which is based upon the capacity of the system, is determined and then assigned to various engines that belong in a particular system. The set of optimization solutions includes engine operating targets or setpoints, which are based upon a snapshot in time of then-current operating conditions and/or a collection of historical performance data for the system. In some embodiments, the set of optimization solutions can be further based on operating profiles, which are determined based on known combinations of loads coming online or going offline at the same time or in a predictable fashion or sequence. The optimization solutions can be further based on the expectation or probability of loads going online or offline based on a known usage pattern, which usage pattern is determined empirically by the controller or is predefined. The optimal engine running conditions are determined for the various setpoints, and boundaries are set around each condition to create operating zones or ranges for each engine. Each zone may include a different range and a different setpoint for each engine of the system, and multiple zones may be defined to cover the operating range of each system, defined as the range of power that system outputs during operation. The operating zone for the system is determined based on the system's history and also on the system's then-present output load. When the system approaches a boundary condition between zones, the system automatically transitions to the next operating condition or zone, which can be above or below the current zone. Zones may overlap to provide hysteresis during transient system operation for improved stability and efficiency of the system overall.

Figure 1:
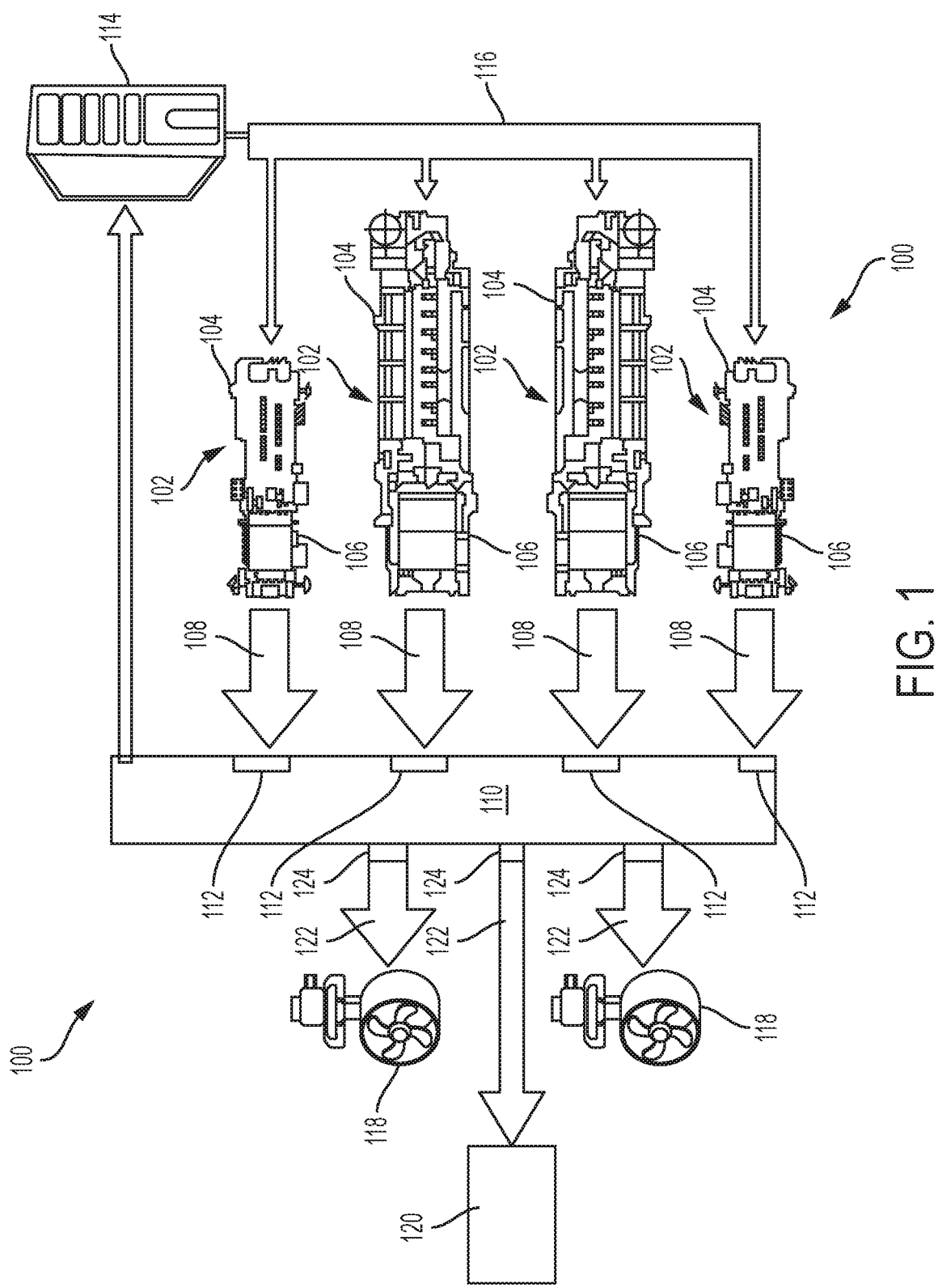
FIG. 1 is a block diagram of an electrical power system including multiple power sources in accordance with the disclosure.

A block diagram for a power system 100 is shown in FIG. 1 for illustration of various main components of a power system, but it should be appreciated that additional or fewer components than the ones shown may make up a given power system. The power system 100 may be present and operating in a marine vessel such as a boat or floating platform. The power system 100 includes a plurality of gensets 102, each of the plurality of gensets 102 including an engine 104 that is connected to and operates an electrical power generator 106 such that a plurality of generators 106 are present in the power system 100. In the illustrated embodiment, four gensets 102 are shown, but fewer or more than four can be used. Also in the illustrated embodiment, it can be seen that two of the gensets 102 have a larger displacement engine 104 associated therewith, and thus have a larger power output capability by the remaining two, smaller capacity gensets 102.

Each of the plurality of gensets 102 operates to provide electrical power 108 to an electrical bus 110. A sensor 112 may monitor the output or contribution of electrical power 108 to the bus 110 from each of the gensets 102 and provide a corresponding signal indicative of the power contribution to a master controller 114 that is included as part of the system 100. The master controller 114, which is associated with the bus 110 and also includes a communication channel 116 that is associated with the engines 104 and provides control information thereto, monitors the voltage and other electrical parameters of the bus to ensure that sufficient power is available at the bus 110 during operation. Accordingly, at times when electrical power consumption from loads connected to the bus increases, the master controller 114 may command one or more of the engines 104 to increase their power output 108 and, conversely, when power consumption by loads connected to the bus decreases, the master controller 114 may command the engines 104 to decrease their power output and, thus, decrease the electrical power 108 produced by the generators 106.

The master controller 114 may be a programmable logic controller (PLC) or, in general, an electronic controller or computer that operates according to computer executable or logic commands or programs. In some embodiments, the master controller 114 (including the electronic controller) may be implemented using hardware and/or software. The master controller 114 may be a single controller or may include more than one controller disposed to control various functions and/or features of the system 100 and/or a machine in which the system 100 operates such as a marine vessel. For example, a controller, used to control the overall operation and function of the vessel, may be cooperatively implemented with one or more additional controllers such as the master controller 114 and/or engine controllers used to control the engines 104. In this embodiment, the term "controller" is meant to include one, two, or more controllers that may be associated with the system 100 and that may cooperate in controlling various functions and operations of the system 100. The functionality of the master controller 114, while described conceptually herein to include various discrete functions for illustrative purposes only, may be implemented in hardware and/or software without regard to the discrete functionality described. Accordingly, various interfaces of the controller are described relative to components of the power system 100 but interfaces are not intended to limit the type and number of components that are connected, nor the number of controllers that are described.

During operation, various components and systems a machine or vessel in which the power system 100 is installed will operate by consuming electrical power from the bus 110. For example, propulsion modules 118 (two shown) and other power consumers 120 such as HVAC systems, drilling machines, lighting systems and/or the like are connected to and draw electrical power 122 from the bus 110. Sensors 124 that are in communication with the master controller 114 may monitor the power draw from the bus 110 and provide signals indicative of the power draw to the master controller 114. For a stable system, the net power input to the bus 110 should equal the net power output 122 from the bus 110 such that the voltage of the bus 110 can remain within an acceptable range. This means that, as the propulsion modules 118 are activated, deactivated or operate at different speeds, and also as other power consumers 120 come online or go offline, the power output 122 relative to the bus 110 will change, which will cause a corresponding change to the power input to the bus 110 from the gensets 102 by the master controller 114. This principle of operation would be similar for hybrid electrical systems in which some of the engines 104 may include a further, mechanical output that drives a mechanical power consumer in addition to the generators such as a propeller shaft.

Figure 2:
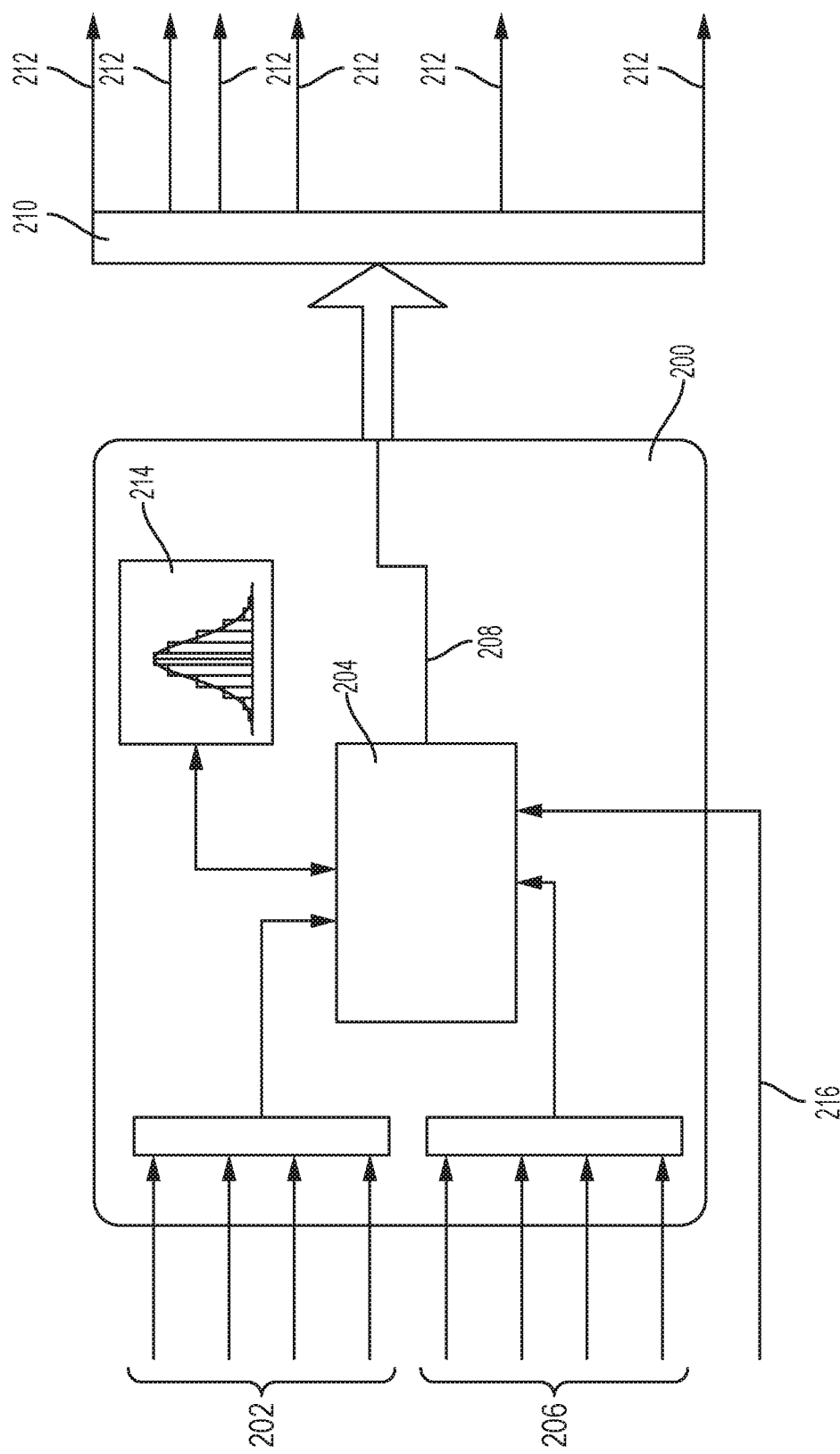
FIG. 2 is a block diagram of a power system controller in accordance with the disclosure.

A block diagram for a controller 200 is shown in FIG. 2. The controller 200 may be operating within the master controller 114 (FIG. 1) to carry out the various control functions discussed herein. The controller 200 includes various inputs and outputs that include operating parameters of the power system 100, and processors that process information relative to the system 100 to control, at least in one respect relative to the present disclosure, the operation of the engines 104 (FIG. 1). More specifically, the controller 200 is configured to receive various inputs 202, each of which may provide information indicative of the real-time or instantaneous power consumption of each power consumer device or system that is associated with an electrical bus. For example, the inputs 202 may be the signals provided by the sensors 124 (FIG. 1) that monitor the power consumption of the propulsion modules 118 and the other electrical power consumers 120 that are connected to the bus 110.

The inputs 202 are provided to a processor 204, which monitors the total power consumption of a power system, for example, the power system 100. The processor 204 further receives a plurality of inputs 206, which represent signals indicative of the power contribution of each of a plurality of gensets to the bus, for example, the power contributions 108 of the gensets 102 to the bus 110 as measured or determined by the sensors 112, shown in FIG. 1. During operation, the processor 204 balances the electrical power input and output to the bus as indicated by the inputs 202 and 206 to provide commands to the gensets and control their output to maintain a controlled voltage at the bus. The processor 204 may operate based on any known control scheme to achieve this function including, but not limited to, a closed loop control system, a model-based algorithm, a learning algorithm and the like. Commands from the processor 204 are provided for all engines in the form of a command signal 208, which is distributed by a distributor 210 into individual commands 212 that are relayed, one each, to each genset.

When a controller 200 is first installed in a vessel or other application, the processor 204 undergoes a conditioning, calibration or learning phase, in which operation of the system is monitored for a period to categorize the level of power consumption into particular ranges or zones. During this learning phase, the processor 204 may control the gensets without limitation as was the case in the past, but may collect usage information to compile a timed series of consumption levels with respect to time, which the processor then automatically compiles into a histogram 214 or, equivalently, a time-series collection of data having a mean and standard deviation. The histogram 214, or an equivalent data representation such as a time-series data set, which represents various zones of system operation, each zone representing an operating point that the system spends 1/n of its operating life, for n zones, is created and stored in non-volatile memory of the controller 200 for use during operation. In an alternative embodiment, for applications with known service profiles, the histogram may be provided and stored in the controller 200.

With respect to the embodiment shown in FIG. 2, the processor 204 will first determine the number of zones that are sufficient to cover the entire operating range of the system. The zones are determined based on a partition of the operating range of the system into subsets, each subset having a base power rating and a dynamic power range associated therewith. The base power ranges and dynamic power ranges are selected from within the operating range of the system and represent those operating points of the system that are more typical or expected. The processor will then optimize each zone around a desired operating point that reflects the particular system output for the zone. Based on the degree and frequency of output power variability of the system, the processor 204 will further define a range above and below the desired operating point of each zone, which constitutes the dynamic range for each zone. The processor may thus define a range of output values that are covered by each zone. As previously stated, for highly variable systems, the zone ranges may overlap to provide system stability. Once zones have been defined that cover the entire operating range of the system, which is defined here as the collection of operating points that the system operates in, engine or genset control by the controller 200 may be carried out in accordance with the particular zone of operation that covers the instantaneous power consumption of the system.

In an exemplary zone of operation, to illustrate the principle of operation of the processor 204, a system may include four engines, each operating a generator. Two of the generators may have a higher power capacity than the remaining two generators. This means that the larger capacity generators may be operated by larger displacement engines, which are more efficient if operated in a steady state, and the two smaller capacity generators may be operated by two smaller engines, which are more efficient when operating in transient modes. The zone may cover a power output of about 4,000 kW. The controller 200 may command each of the four engines for a particular zone as provided in Table 1 below:

TABLE 1

| Genset # | Capacity | Output (kW) | Variability (kW) |
|---|---|---|---|
| 1 | Larger | 1,500 | ±100 |
| 2 | Larger | 1,500 | ±150 |
| 3 | Smaller | 500 | ±300 |
| 4 | Smaller | 500 | ±350 |
| | TOTAL -> | 4,000 | 1,800 |

Engine commands by the controller, in this context, include fueling commands provided to each engine, which determine the power output of each engine and, thus, the power input and output of an electrical power generator that is connected to the engine.

As can be seen from Table 1 above, the two larger gensets may be operated at a larger power output but be allowed to vary their output by a lesser amount than the smaller capacity gensets, which are operated at a lower power output but are allowed to vary their output more. The particular power output of each genset can be selected and optimized for each of a plurality of operating zones, which zones collectively span an entire operating range of the engine. The selection or identification of the particular zones by the controller can be made once for a particular vessel or application, or can be repeated for each operating mode of the vessel or for each application associated with the vessel. For example, the particular zones for a dynamic positioning mode of the vessel may be different than the particular zones for a transit mode of the vessel, which may be different than the particular zones for a pulling mode of the vessel. Other factors that may be considered when deciding where certain gensets may operate include the age of each genset, the operating time since each genset was last serviced, and other factors that may affect the performance of each genset. In other words, the operation of each genset in each zone may be tailored to each particular genset to make the operation of the overall system more efficient. Information about each genset, as mentioned above, can be provided by a user to the processor 204 in the form of a data file 216.

Figure 3:
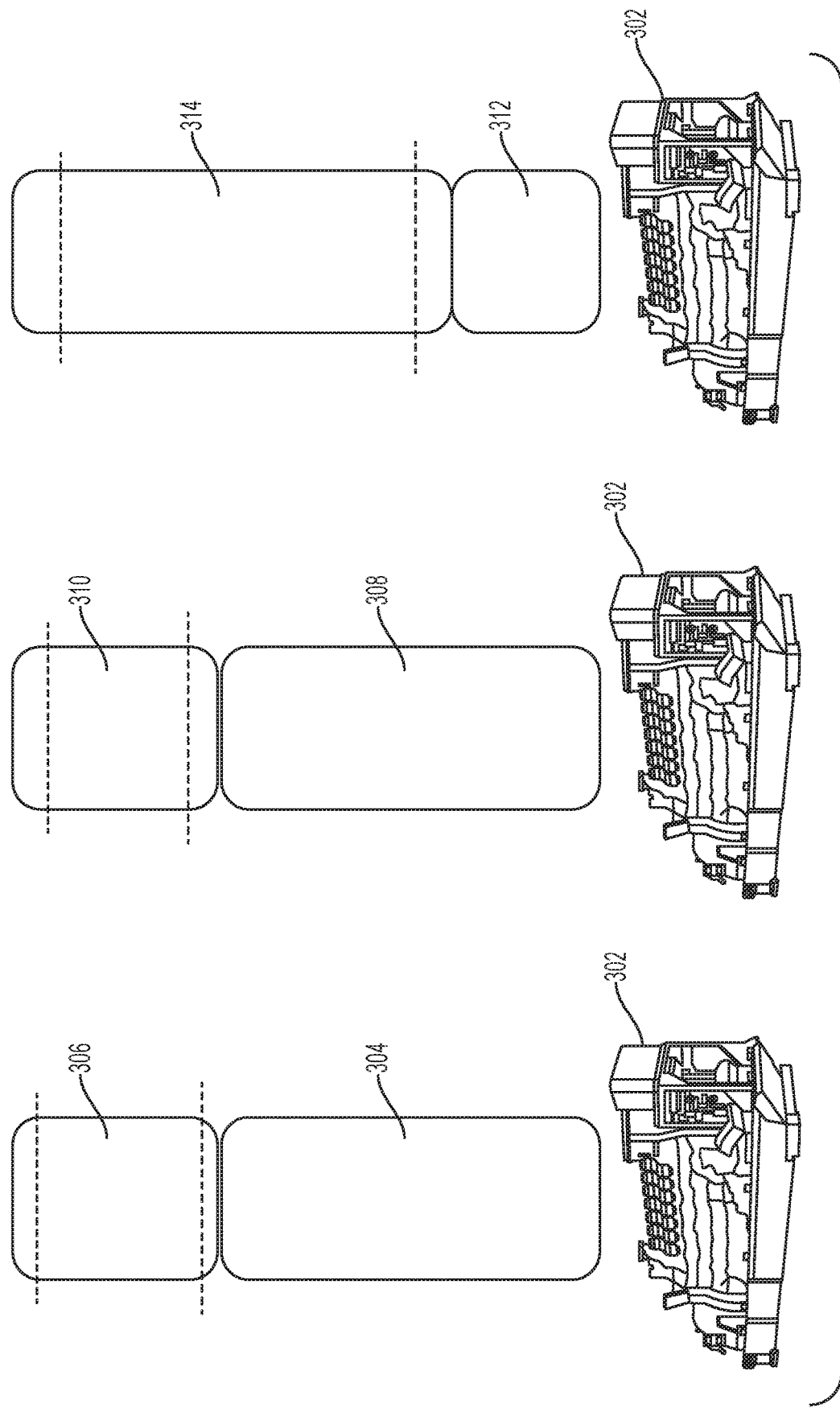
FIG. 3 is a schematic diagram of engine load allocation in accordance with the disclosure.

The allocation of transient load sharing for each of a plurality of gensets may change, even if the gensets have the same power output capacity, given that, in general, gensets may operate less efficiently during a transient operating mode. An additional example of power allocations between gensets in a system operating at a particular zone is shown graphically for a system including three gensets in FIG. 3. In this illustration, a system 300 includes three gensets 302 of equal capacity. A first genset 302, shown on the left of the figure, may be operating at a base power output 304 of about 4,000 kW with a dynamic range 306 of about 1,000 kW. This means that, for the zone illustrated, the first genset 302 may be operating at a baseline output of 4,500 kW, with a dynamic range of ±500 kW.

A second genset 302, shown in the middle of the figure, may also be operating at a base power output 308 of about 4,000 kW with a dynamic range 310 of about 1,000 kW, which means that, similar to the first genset 302 for the zone illustrated, the second genset 302 may be operating at a baseline output of 4,500 kW, with a dynamic range of ±500 kW.

A third genset 302, shown on the right side of the figure, may be operating at a base power output 312 of about 1,000 kW with a dynamic range 314 of about 4,000 kW. This means that, for the zone illustrated, the third genset 302 may be operating at a baseline output of 3,000 kW, with a dynamic range of ±2000 kW. For the total system 300, therefore, the base power output may be about 12,000 kW with a dynamic range of ±3,000 kW. As can be appreciated, each zone, similar to the zone illustrated in FIG. 3, may allocate base loads and dynamic loads to different engines if efficiencies, e.g. fuel consumption, emissions and/or the like, may be gained by an uneven allocation of the steady state load and also the transient load between engines. The uneven allocation can also include shutting a genset down completely for certain operating zones that do not require high power outputs of the system to conserve fuel and to reduce emissions.

Figure 4:
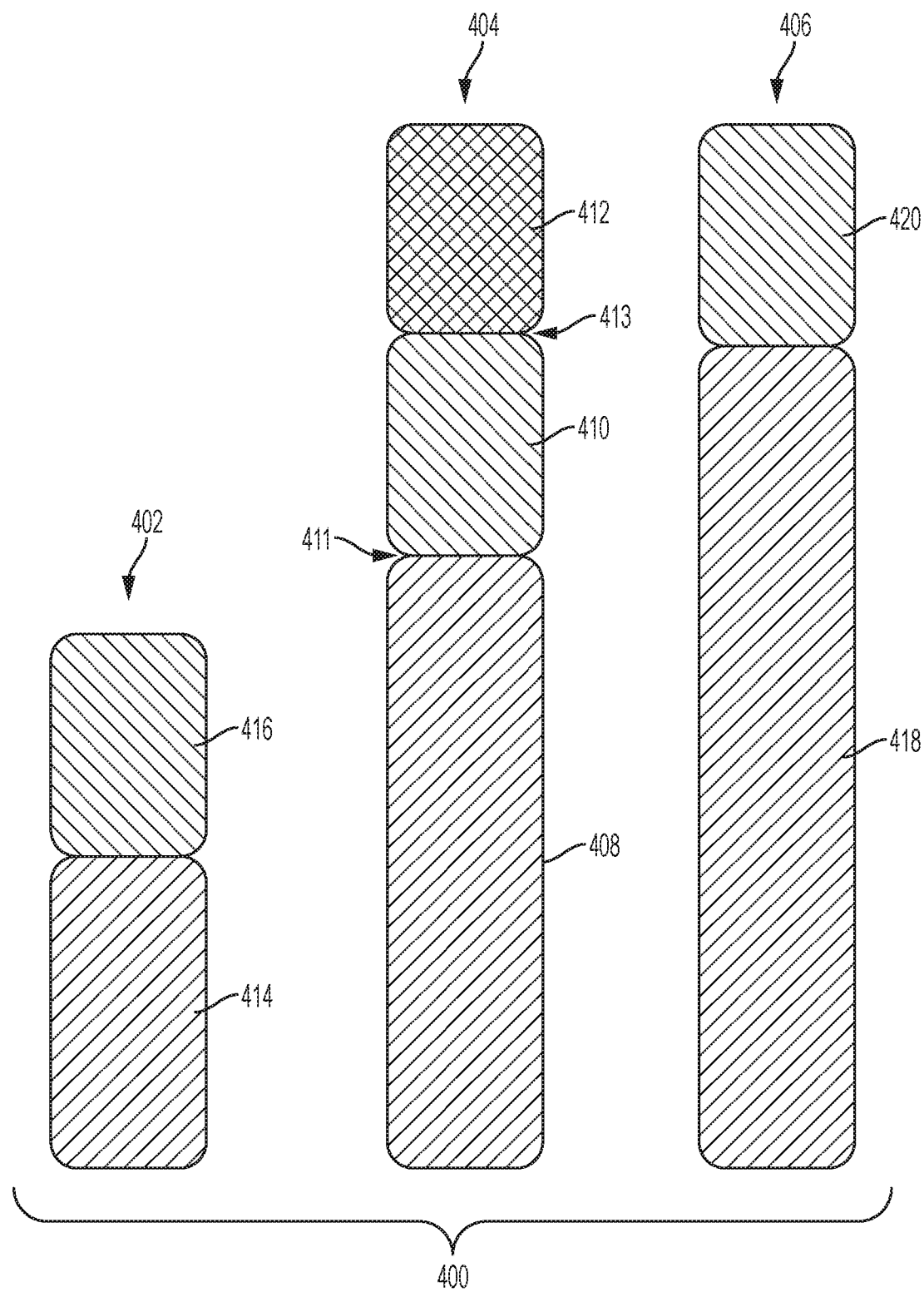
FIG. 4 is a schematic diagram of operation zones for power sources in a system in accordance with the disclosure.

A graphical representation of the power distribution in a power system 400 between a current zone 404, and also a zone above 406 the current zone 404 and a zone below 402 the current zone 404, is shown in FIG. 4. In this illustration, the current zone 404 includes a base power output 408, which represents the aggregate base power output of a power system and may be allocated among different gensets, as discussed above. A dynamic power output 410 is also present in the zone 404, which as shown includes a spare power output 412, shown merely for illustration.

When the power consumed by the system drops below the low end 411 of the dynamic power output 410 and crosses into the base power output 408, operation of the system will transition to the adjacent zone 402 that is below the zone 404. Like the zone 404, the lower zone 402 includes a base power output 414, which is lower than the base power output 408, and a dynamic power output 416, which may have the same, larger or smaller magnitude than the dynamic power output 410, depending on the optimization determined by the controller.

When the power consumed by the system climbs above the high end 413 of the dynamic power output 410, operation of the system will transition to the adjacent zone 406 that is above the zone 404. Like the zone 404, the higher zone 406 includes a base power output 418, which is higher than the base power output 408, and a dynamic power output 420, which may have the same, larger or smaller magnitude than the dynamic power output 410, depending on the optimization determined by the controller.

Figure 5:
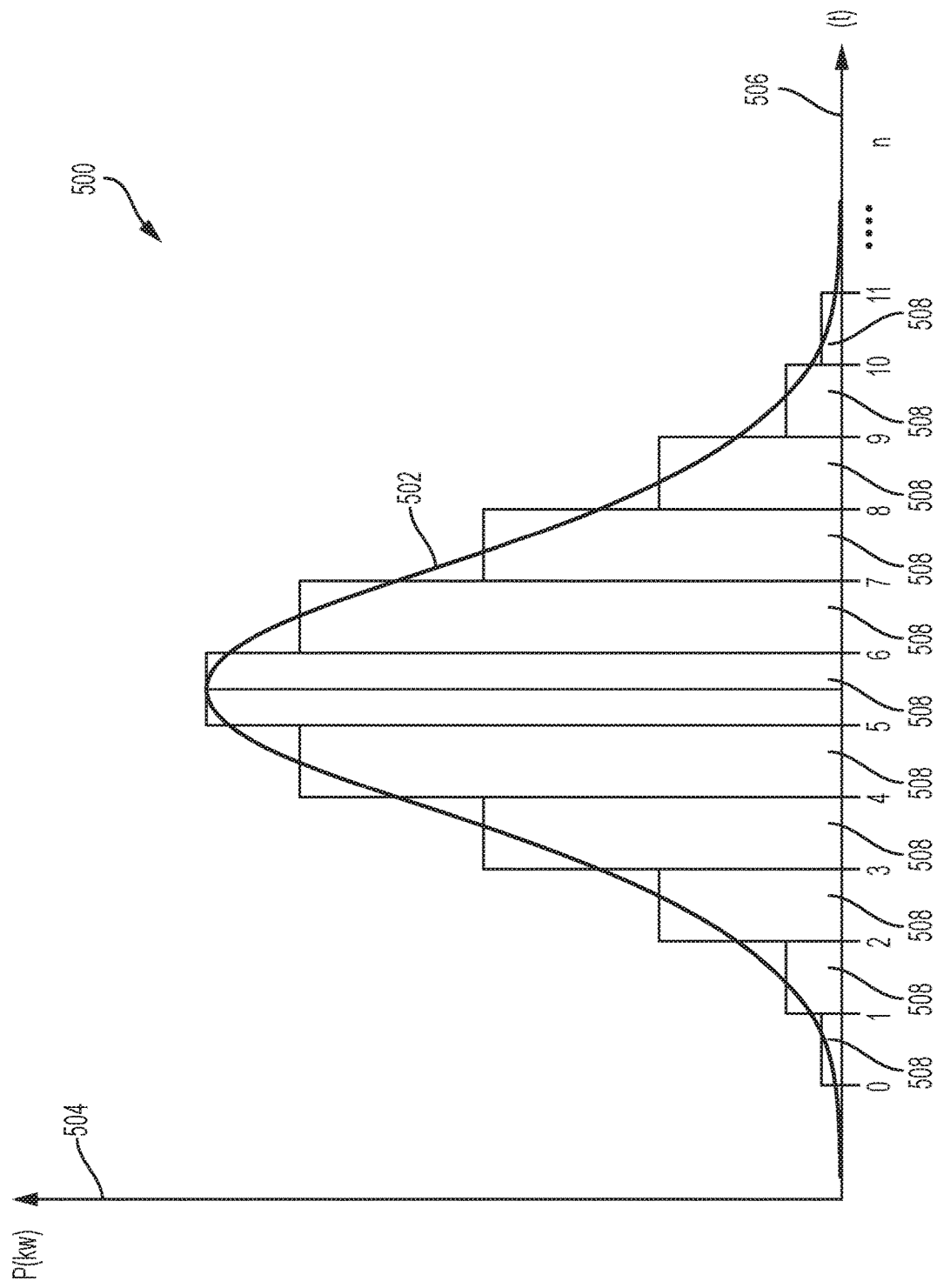
FIG. 5 is a histogram showing an exemplary zone allocation for a system in accordance with the disclosure.

A histogram 500 showing an exemplary usage profile for a machine, which can be used to determine an allocation of zones for a power system is shown in FIG. 5. The histogram 500 is shown for illustration of how the number of zones may be selected to cover an entire operating range of a system. The histogram 500, or a similar or data representation, may be compiled automatically by a processor by monitoring operation of a system for a period, specifically, the power consumption of the system and the duration of each operating condition of the system over the period. With at least this information, the controller may compile a usage curve 502, which shows the power consumption 504 over time 506 in the form of the histogram 500. The usage curve 502 is shown for illustration and may not necessarily be created or plotted by the controller. The controller may then separate the aggregate data into discrete power zones, based on the distribution bars of power with respect to time 508 on the histogram 500.

Each bar 508 may represent a time period in which the power consumption of a power system is within a range of powers. Eleven such bars 508 are shown in FIG. 5, which can be used as a basis to calculate a baseline and dynamic range for eleven power zones, but it should be appreciated that any number may be used. For example, for systems having large variability or fluctuation in power consumption over time, a larger number of zones may be used. In general, the controller will separate the total operating time into (n)

zones and allot each zone the operating points that the system will operate in (1/n) of the time. The power in the lowest and highest zones may not necessarily be selected based on the lowest and highest capacity of the system but, rather, based on the highest and lowest power consumptions of the system that are reflected in the histogram or that were observed by the controller during the observation time in which data was compiled to create the histogram. As can be appreciated, while the histogram 500 is shown to represent a particular distribution, any other distribution type that more accurately reflects the actual usage profile of a system may be used.

INDUSTRIAL APPLICABILITY

Figure 6:
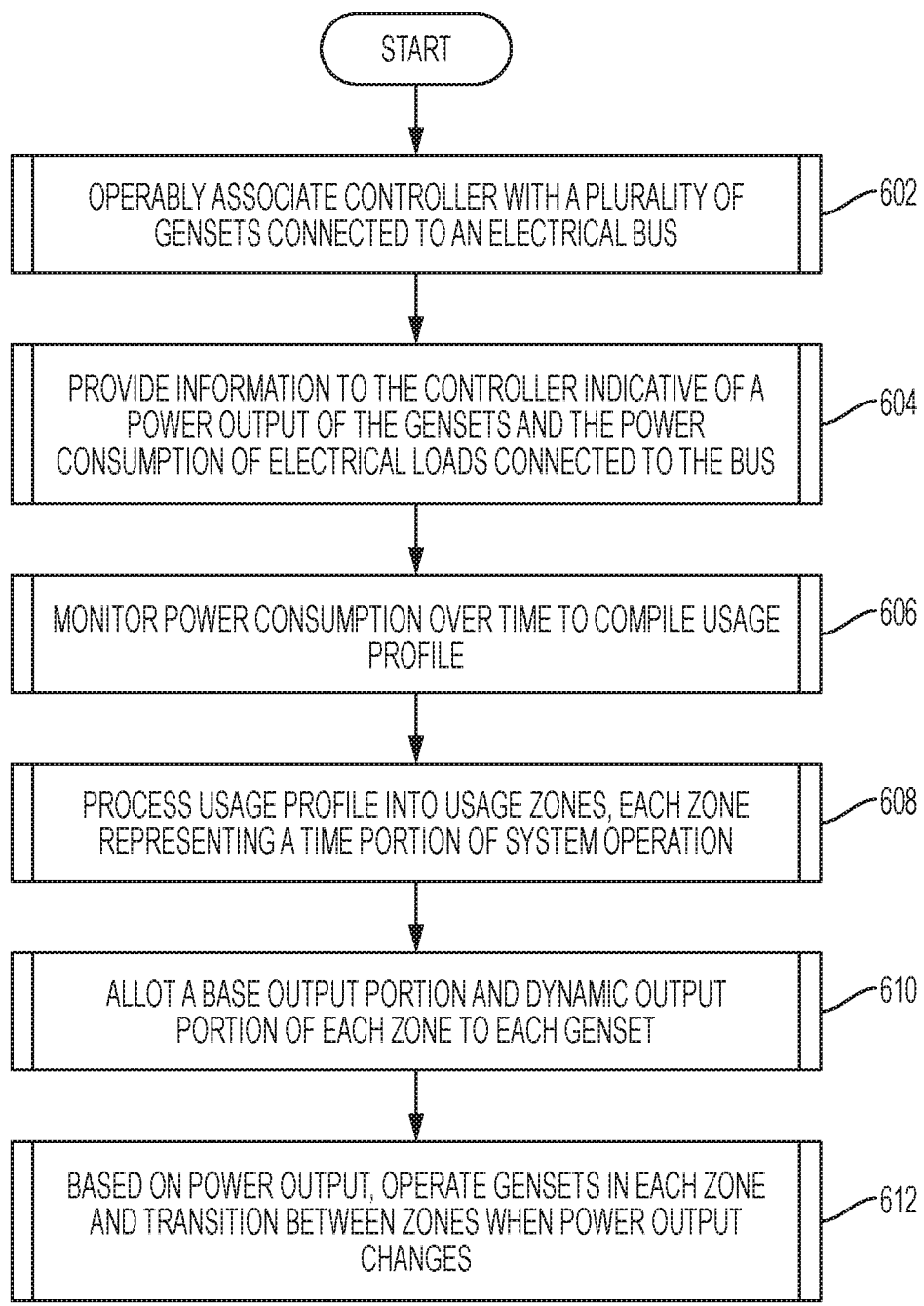
FIG. 6 is a flowchart for a method in accordance with the disclosure.

A flowchart for a method of operating a power system (that includes a plurality of gensets and various consumers of electrical power that draw power from the gensets) is shown in FIG. 6. As shown, the method includes operably associating a controller, for example, the controller 114 (FIG. 1), with a plurality of gensets, for example, the gensets 102 (FIG. 1), and also with an electrical bus, for example, the electrical bus 110 (FIG. 1) at 602. The system operates and various sensors provide information to the controller indicative of a power output of the gensets and the power consumption of electrical loads connected to the bus at 604. For a marine vessel, for example, electrical loads can include propulsion systems, HVAC, work tools, lighting and the like.

The controller monitors power consumption over time and compiles a usage profile at 606. For illustration, the monitoring period may be predetermined and span a reasonable time in which the vessel will operate a full service cycle. For a tugboat, the monitoring time may be a few days while for a large container ship the monitoring time may span a period of a few weeks to include a complete voyage. The information collected by the controller may be processed in to a usable form such as a histogram. The collected and processed information is analyzed and used as a basis to determine a plurality of operating zones for the system at 608. Each zone is defined using a base load and a dynamic load range. The base load and dynamic load range may overlap for adjacent zones and represent the load at which the machine is operating for a fraction of the total service times. The various time fractions of machine operation, as illustrated by the histogram, serve as a basis for defining a plurality of zones.

The controller further allots a portion of the base load and dynamic load range of each zone to each of the plurality of gensets at 610, and operates the gensets on this basis at 612 by either remaining in a zone, when the power consumed does not fall outside of the boundaries of that zone, or transitions to an adjacent upper or lower zone when the consumption crosses an upper or lower boundary of the then-present zone.

In some embodiments, control logic or a set of computer executable instructions for the electronic controller can be developed to select a control variable that determines how power is allocated among various gensets connected to one or more electrical buses. For example, the control logic can select a power allotment as between various gensets based on whether each is already online and operating, or has been shut down, based on the historical operation of each genset, based on a predicted change in load, based on a reserve capacity that the genset has, the amount of excess generating capacity that is desired or necessary to be available for a given vessel operating mode, and the like. Regarding the engines operating the various gensets, the logic may allot power to each genset based on the capacity of the genset's engine, engine efficiency, engine health or status, and/or the like.

For example, an engine may be locked out (or disabled) for maintenance or other reasons and therefore it should be excluded from the control arrangement. Diagnostic or prognostic information from each engine may also be used to favor (or consider/select) one unit over another because of remaining useful life or maintenance predictions. For example, a genset with lower operational hours since its last may be preferred over a genset that is approaching its next service interval. Further, running engines that are online will typically be favored over engines that are shut down or offline because of the costs associated with starting/stopping engines (e.g., starting and stopping engines consumes fuel without delivering any useful work). The engine run time may also be used in selecting whether to use an engine. Nevertheless, the selection of an engine and an amount of power can be made via a user selectable option.

Certain applications or vessels may also have busses that aren't able to handle the rated power of all gensets connected to that bus, so the engines or gensets operating on that bus can be limited to the maximum power that the bus can handle. In some embodiments, a priority strategy may also be used to determine which engine or genset should be brought online or offline. Given that starting and stopping engines consumes fuel without delivering any useful work, such events can be minimized by the logic, as described above.

In some implementations, the control logic may operate such that the next engine to start should be the most efficient engine that is currently offline; the next engine to stop should be the least efficient engine that is currently online, and so forth. Such a control scheme can use certain constrains such as when in combined bus operation engines will be operated such that if an emergency occurs and the vessel goes into split bus to protect critical systems, each split bus would have a generator already online. This is to minimize any blackout conditions that may occur during a transition from combined to split bus. Moreover, the priority strategy will ensure there is sufficient spinning reserve based upon vessel operating mode. It may be the case that the units that are online are not as efficient for a new operating condition, or are no longer able to meet the power requirements, which the strategy may address by implementing exceptions such as switching to a smaller engine from a bigger one when power demands decline, while still minimizing the number of start and stops, switching a smaller capacity unit with a larger one when power demands increase, prioritizing the most efficient gensets, choosing to run units with lower service hours, trying to run the least number of units possible, and others.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

No element/component, act/action performed by any element/component, or instruction used herein should be construed as critical or essential unless explicitly described as such. Additionally, the phrase "based on" is intended to mean "based, at least in part, on" unless explicitly stated otherwise. Furthermore, the articles "a" and "an," as used herein, are intended to include one or more items, and may be used interchangeably with "one or more." In the event only one item is intended, the term "one" or similar language is used. Moreover, the terms "has," "have," "having," or the like, as also used herein, are intended to be open-ended terms.

We claim:

1. A power system for a vessel, comprising:
   a plurality of gensets, each genset including an engine connected to an electrical power generator such that the plurality of gensets includes a plurality of engines and a plurality of electrical power generators, wherein the plurality of electrical power generators is adapted to provide electrical power to an electrical bus of the vessel, the electrical bus of the vessel being connected to one or more power consuming devices or systems onboard the vessel;
   at least one sensor associated with the electrical bus, the at least one sensor providing an electrical signal during operation, the electrical signal being indicative of an electrical power consumption through the electrical bus, wherein the electrical power consumption is variable over time and wherein the at least one sensor is configured to provide the electrical signal, in real time; and
   an electronic controller associated with the plurality of gensets and with the at least one sensor, the electronic controller programmed and configured to:
   monitor the electrical signal during operation to determine an instantaneous power consumption;
   compare the instantaneous power consumption with a plurality of power consumption zone boundaries to classify the instantaneous power consumption into a selected one zone of the plurality of power consumption zones, wherein each of the plurality of power consumption zones includes a corresponding base power value and a corresponding dynamic range value;
   apportion the corresponding base power value and the corresponding dynamic range value of the selected one zone among the plurality of gensets; and
   provide command signals to operate each genset of the plurality of gensets based on the corresponding base power value and the corresponding dynamic range value of the selected one zone that is allotted to each genset of the plurality of gensets.

2. The power system of claim 1, wherein the electronic controller is further programmed and operates to record values of the instantaneous power consumption with respect to time over a period of time, and to analyze the recorded values to determine the plurality of power consumption zone boundaries.

3. The power system of claim 2, wherein the plurality of power consumption zones are overlapping.

4. The power system of claim 2, wherein analyzing the recorded values to determine the plurality of power consumption zone boundaries includes compiling at least one of a usage histogram or a set of time-series data within the electronic controller based on the recorded values.

5. The power system of claim 1, wherein apportioning the base power value and the dynamic range value among the plurality of gensets includes assigning unequal portions of the base power value to each genset and assigning unequal portions of the dynamic range value to each genset.

6. The power system of claim 1, further comprising ranking each genset of the plurality of gensets for order of operation based on a system parameter.

7. The power system of claim 5, wherein assigning unequal portions of the base power to each genset and assigning unequal portions of the dynamic range to each genset are based on various parameters including the power capacity of each genset, an age of each genset, a fuel consumption of each genset, and an emissions rating of each genset.

8. The power system of claim 1, wherein the plurality of power consumption zones spans over an entire operating range of the power system.

9. The power system of claim 8, wherein the expected operating range of the power system is less than a possible operating range of the plurality of gensets.

10. An electrical power system for a marine vessel, the electrical power system comprising a plurality of gensets, each genset including an engine connected to an electrical power generator, wherein a plurality of electrical power generators is connected to an electrical bus of the marine vessel, the electrical bus of the marine vessel being connected to one or more power consuming devices or systems onboard the marine vessel, the electrical power system comprising:
    at least one sensor associated with the electrical bus, the at least one sensor providing an electrical signal during operation, the electrical signal being indicative of an electrical power consumption through the electrical bus, wherein the electrical power consumption is variable over time and wherein the at least one sensor is configured to provide the electrical signal, in real time; and
    an electronic controller associated with the plurality of gensets and with the at least one sensor, the electronic controller programmed and configured to:
    monitor the electrical signal during operation to determine an instantaneous power consumption;
    record the instantaneous power consumption with respect to time over a time period as recorded values;
    analyze the recorded values to determine a plurality of power consumption zone boundaries;
    compare the instantaneous power consumption with the plurality of power consumption zone boundaries to classify the instantaneous power consumption into a selected one zone of the plurality of power consumption zones, wherein each of the plurality of power consumption zones includes a corresponding base power value and a corresponding dynamic range value;
    apportion the corresponding base power value and the corresponding dynamic range value of the selected one zone among the plurality of gensets; and
    provide command signals to operate each genset of the plurality of gensets based on the corresponding base power and the corresponding dynamic range value of the selected one zone that is allotted to each genset.

11. The power system of claim 10, wherein the plurality of power consumption zones are overlapping.

12. The power system of claim 10, wherein analyzing the recorded values to determine the plurality of power consumption zone boundaries includes compiling at least one of a usage histogram and a set of time-series data within the electronic controller based on the recorded values.

13. The power system of claim 10, wherein apportioning the base power value and the dynamic range value among the plurality of gensets includes assigning unequal portions of the base power value to each genset, and assigning unequal portions of the dynamic range value to each genset of the plurality of gensets.

14. The power system of claim 13, further comprising ranking each genset of the plurality of gensets based on a system parameter.

15. The power system of claim 14, wherein assigning unequal portions of the corresponding base power and the corresponding dynamic range to each genset is based on various parameters including the power capacity of each genset, an age of each genset, a fuel consumption of each genset, and an emissions rating of each genset.

16. The power system of claim 10, wherein the plurality of power consumption zones spans over an entire operating range of the power system.

17. A method for operating a power system for a marine vessel, the power system comprising a plurality of gensets connected to an electrical bus of the marine vessel, the electrical bus of the marine vessel being connected to one or more power consuming devices or systems onboard the marine vessel, the method comprising:
   using a sensor associated with the electrical bus to provide an electrical signal indicative of an electrical power consumption through the electrical bus to an electronic controller;
   monitoring the electrical signal with the electronic controller to determine an instantaneous power consumption;
   compiling a set of recorded values in the electronic controller, the recorded values being indicative of the instantaneous power consumption with respect to time for a time period;
   analyzing the recorded values with the electronic controller to determine a plurality of power consumption zone boundaries;
   comparing the instantaneous power consumption with the plurality of power consumption zone boundaries to classify the instantaneous power consumption into a selected one zone of the plurality of power consumption zones, wherein each of the plurality of power consumption zones includes a corresponding base power value and a corresponding dynamic range value;
   apportioning the corresponding base power value and the corresponding dynamic range value of the selected one zone among the plurality of gensets; and
   providing command signals to operate each of the plurality of gensets based on the corresponding base power value and the corresponding dynamic range value of the selected one zone that is allotted to each genset.

18. The method of claim 17, wherein analyzing the recorded values to determine the plurality of power consumption zone boundaries includes compiling at least one of a usage histogram and a set of time-series data within the electronic controller based on the recorded values.

19. The method of claim 17, wherein apportioning the base power value and the dynamic range value among the plurality of gensets includes assigning unequal portions of the base power value and the dynamic range value to each genset.

20. The method of claim 19, further comprising ranking each genset from the plurality of gensets based on a system parameter including a power capacity of each genset, an age of each genset, a fuel consumption of each genset, and an emissions rating of each genset of the plurality of gensets.

* * * * *